US010819870B2

(12) United States Patent
Abe et al.

(10) Patent No.: US 10,819,870 B2
(45) Date of Patent: Oct. 27, 2020

(54) IMAGE PROCESSING APPARATUS, APPARATUS, METHOD OF SWITCHING MODE OF THE IMAGE PROCESSING APPARATUS, AND NON-TRANSITORY STORAGE MEDIUM STORING PROGRAM EXECUTABLE BY COMPUTER OF THE IMAGE PROCESSING APPARATUS

(71) Applicant: BROTHER KOGYO KABUSHIKI KAISHA, Nagoya-shi, Aichi-ken (JP)

(72) Inventors: Naoki Abe, Ichikawa (JP); Hajime Usami, Nagoya (JP)

(73) Assignee: BROTHER KOGYO KABUSHIKI KAISHA, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/229,340

(22) Filed: Dec. 21, 2018

(65) Prior Publication Data
US 2019/0199880 A1    Jun. 27, 2019

(30) Foreign Application Priority Data

Dec. 27, 2017   (JP) ................. 2017-252341

(51) Int. Cl.
*H04N 1/00* (2006.01)
*G06F 1/26* (2006.01)

(52) U.S. Cl.
CPC ......... *H04N 1/00888* (2013.01); *G06F 1/266* (2013.01); *H04N 1/00904* (2013.01); *H04N 2201/0094* (2013.01)

(58) Field of Classification Search
CPC ........... H04N 1/00888; H04N 1/00904; H04N 2201/0094; G06F 1/266
See application file for complete search history.

(56) References Cited

U.S. PATENT DOCUMENTS

| 2010/0306565 | A1* | 12/2010 | Umedu | .......... G06F 1/266 713/324 |
| 2014/0101345 | A1* | 4/2014 | Ranta | .......... G06F 11/3051 710/16 |
| 2015/0264208 | A1* | 9/2015 | Achiwa | .......... H04N 1/00885 358/1.15 |
| 2016/0337540 | A1* | 11/2016 | Fujisawa | .......... H04N 1/00891 |
| 2018/0067530 | A1* | 3/2018 | Hsieh | .......... G06F 1/22 |

FOREIGN PATENT DOCUMENTS

JP          2015174373 A    10/2015

* cited by examiner

*Primary Examiner* — Neil R McLean
(74) *Attorney, Agent, or Firm* — Scully Scott Murphy and Presser

(57) ABSTRACT

An image processing apparatus includes an image-data processor, an interface, a power source, and a controller. The controller selects a first mode, a second mode, or a third mode as a power supply mode. In the first mode, electric power is supplied from the power source to the image-data processor and the interface. In the second mode, supply of the electric power from the power source to the image-data processor and the interface is in a stopped state. In the third mode, the electric power is supplied from the power source to the interface, but supply of the electric power to the image-data processor is in a stopped state. The controller switches the power supply mode from the second mode to the third mode in response to receiving a power supply request from an external device via the interface in the second mode.

18 Claims, 5 Drawing Sheets

IMAGE PROCESSING APPARATUS, APPARATUS, METHOD OF SWITCHING MODE OF THE IMAGE PROCESSING APPARATUS, AND NON-TRANSITORY STORAGE MEDIUM STORING PROGRAM EXECUTABLE BY COMPUTER OF THE IMAGE PROCESSING APPARATUS

CROSS REFERENCE TO RELATED APPLICATION

The present application claims priority from Japanese Patent Application No. 2017-252341, which was filed on Dec. 27, 2017, the disclosure of which is herein incorporated by reference in its entirety.

BACKGROUND

The following disclosure relates to an image processing apparatus, an apparatus, a method of switching a mode of the image processing apparatus, and a non-transitory storage medium storing a program executable by a computer of the image processing apparatus.

Image processing apparatuses such as a multi-function peripheral (MFP) normally have a plurality of modes including: a normal mode in which operating electric power is suppliable from a power supply circuit to devices of the image processing apparatus; and a sleep mode in which supply of the operating electric power from the power supply circuit to devices of the image processing apparatus except some devices thereof is stopped. For example, when a state in which operations of the devices are stopped in the normal mode has continued for a particular length of time, the mode of the image processing apparatus is switched from the normal mode to the sleep mode to reduce power consumption.

There is known an image processing apparatus including a USB (Universal Serial Bus) interface as an interface for connection to an external device. The USB interface not only enables data communication between the image processing apparatus and the external device but also is capable of supplying electric power to an external device, such as a smartphone and a tablet computer, to which the electric power may be supplied. According to the USB Power Delivery standard, electric power of up to 100 W is suppliable from the USB interface to the external device to which the electric power may be supplied.

In the normal mode, since the electric power is being supplied to the devices including the power supply circuit of the image processing apparatus, when the external device is connected to the USB interface, and a power supply request is received from the external device, the electric power is supplied to the external device. In the case where the image processing apparatus is in the sleep mode when the power supply request is transmitted from the external device connected to the USB interface, however, no electric power is supplied from the power supply circuit to the external device via the USB interface because supply of the electric power from the power supply circuit to the USB interface is stopped.

SUMMARY

Accordingly, an aspect of the disclosure relates to an image processing apparatus capable of supplying electric power from an interface to an external device connected to the interface in a case where supply of electric power is requested from the external device connected to the interface in a mode in which supply of the electric power from the power source to the interface is stopped, to an apparatus, to a method of switching a mode of the image processing apparatus, and to a non-transitory storage medium storing a program executable by a computer of the image processing apparatus.

In one aspect of the disclosure, an image processing apparatus includes: an image-data processor; an interface; a power source; and a controller configured to: select one of a plurality of power supply modes of the image processing apparatus, the plurality of power supply modes including: (i) a first mode, when the image processing apparatus is in the first mode, electric power being supplied from the power source to the image-data processor and the interface; (ii) a second mode, when the image processing apparatus is in the second mode, supply of the electric power from the power source to the image-data processor and the interface being in a stopped state; and (iii) a third mode, when the image processing apparatus is in the third mode, the supply of the electric power from the power source to the image-data processor being in a stopped state, and the electric power being supplied from the power source to the interface; and switch the power supply mode from the second mode to the third mode in response to receiving a power supply request from an external device via the interface when the image processing apparatus is in the second mode.

Another aspect of the disclosure relates to an apparatus including: an engine including at least one of a print engine and a scanner engine, the print engine being configured to print an image on sheet, the scanner engine being configured to scan an image from document; an interface; a power source; and a controller configured to: select one of a plurality of power supply modes of the image processing apparatus, the plurality of power supply modes including: (i) a first mode, when the image processing apparatus is in the first mode, electric power being supplied from the power source to the engine and the interface; (ii) a second mode, when the image processing apparatus is in the second mode, supply of the electric power from the power source to the engine and the interface being in a stopped state; and (iii) a third mode, when the image processing apparatus is in the third mode, the supply of the electric power from the power source to the engine being in a stopped state, and the electric power being supplied from the power source to the interface; and switch the power supply mode from the second mode to the third mode in response to receiving a power supply request from an external device via the interface when the image processing apparatus is in the second mode Yet another aspect of the disclosure relates to a method of switching a mode of an image processing apparatus. The image processing apparatus includes (i) an image-data processor configured to process image data, (ii) an interface configured to communicate with an external device, (iii) a power source, and (iv) a controller. The method includes: a step of causing the controller to select one of a plurality of power supply modes of the image processing apparatus, the plurality of power supply modes including: (i) a first mode, when the image processing apparatus is in the first mode, electric power being supplied from the power source to the image-data processor and the interface; (ii) a second mode, when the image processing apparatus is in the second mode, supply of the electric power from the power source to the image-data processor and the interface being in a stopped state; and (iii) a third mode, when the image processing apparatus is in the third mode, the supply of the electric power from the power source to the image-data processor being in a stopped state, and the electric power being supplied from the power source to the interface; and a step of causing the controller to switch the power supply mode from the second mode to the third mode in response to receiving a power supply request from an external device via the interface when the image processing apparatus is in the second mode.

Yet another aspect of the disclosure relates to a non-transitory storage medium storing a program executable by a computer of an image processing apparatus. The image processing apparatus includes (i) an image-data processor configured to process image data, (ii) an interface configured to communicate with an external device, and (iii) a power source. When executed by the computer, the program causes the image processing apparatus to select one of a plurality of power supply modes of the image processing apparatus, the plurality of power supply modes including: (i) a first mode, when the image processing apparatus is in the first mode, electric power being supplied from the power source to the image-data processor and the interface; (ii) a second mode, when the image processing apparatus is in the second mode, supply of the electric power from the power source to the image-data processor and the interface being in a stopped state; and (iii) a third mode, when the image processing apparatus is in the third mode, the supply of the electric power from the power source to the image-data processor being in a stopped state, and the electric power being supplied from the power source to the interface. When executed by the computer, the program causes the image processing apparatus to switch the power supply mode from the second mode to the third mode in response to receiving a power supply request from an external device via the interface when the image processing apparatus is in the second mode.

Effects

According to the present disclosure, in a case where supply of electric power is requested from an external device connected to an interface in a mode in which supply of electric power from a power source to the interface is stopped, it is possible to supply the electric power from the interface to the external device.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENTS

Hereinafter, there will be described one embodiment by reference to the drawings.

Electric Configuration of Printer

Figure 1:
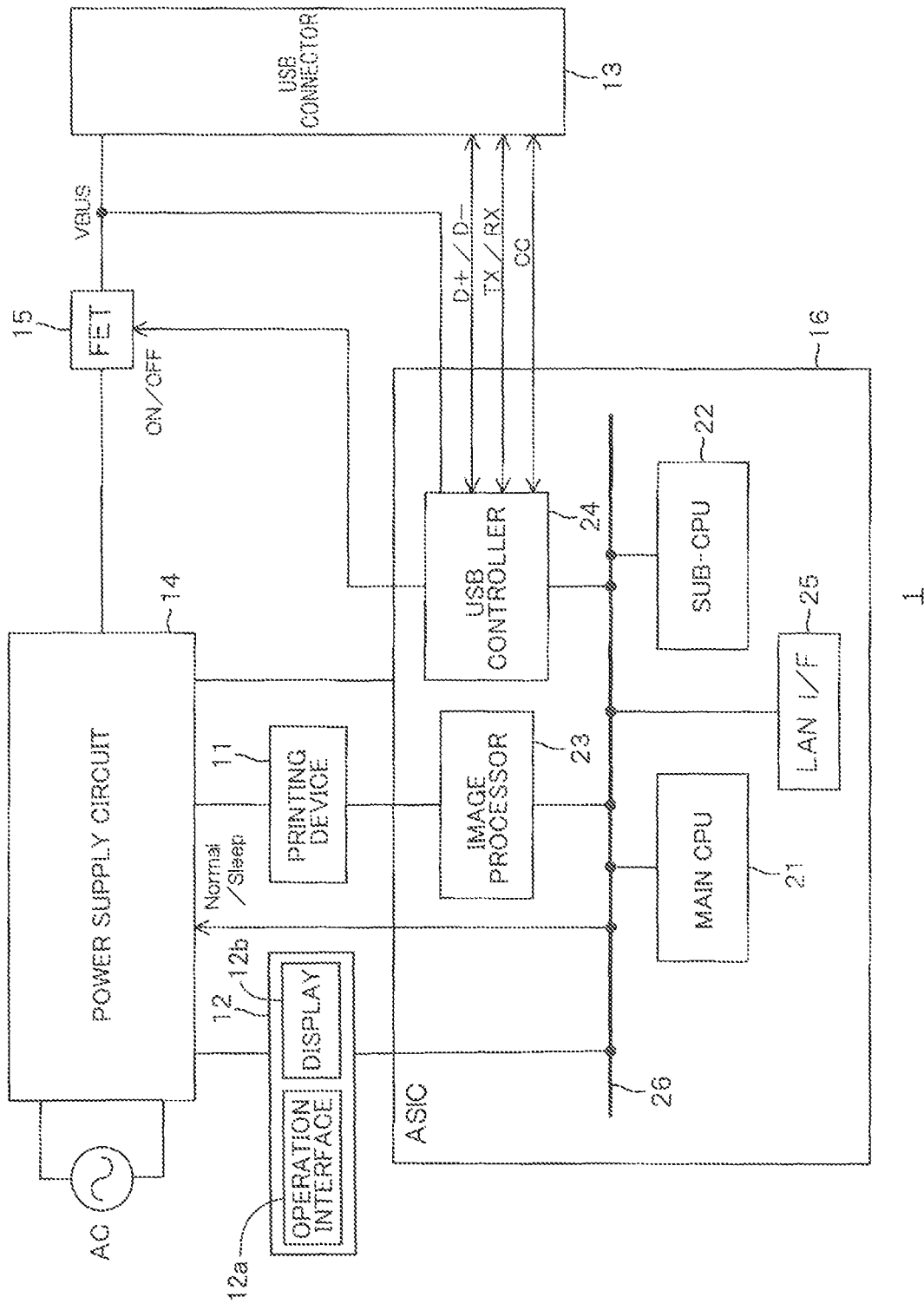
FIG. 1 is a block diagram illustrating an electric configuration of a printer according to one embodiment.

FIG. 1 illustrates a printer 1 as one example of an image processing apparatus according to the present embodiment. The printer 1 includes a printing device 11, an operation panel 12, a USB (Universal Serial Bus) connector 13, a power supply circuit 14, a switch 15, and an application-specific integrated circuit (ASIC) 16.

The printing device 11 (as one example of an image-data processor) is provided in a housing of the printer 1. The printing device 11 is configured to print a color image or a monochrome image on a sheet, such as a printing sheet, conveyed along a conveyance path formed in the housing. Any of electronic photographic printing and ink-jet printing may be employed for image printing.

The operation panel 12 (as one example of a user interface) is provided on an upper surface of the housing and includes an operation interface 12a and a display 12b, for example. The operation interface 12a includes operation keys such as a numeric keypad and cursor keys, for example. When one of the operation keys is operated, the operation interface 12a receives the operation, and the operation panel 12 outputs a signal related to the operation. The display 12b is constituted by a liquid crystal display, for example.

It is noted that the operation interface 12a and the display 12b may be provided individually and may be provided as a touch screen. In the case where the operation interface 12a and the display 12b are provided as a touch screen, the display 12b displays various kinds of information and images such as the operation keys. When one of the operation keys displayed on the display 12b is pushed or touched by a user, the operation interface 12a receives the operation, and the operation panel 12 outputs a signal (data) related to the operation. In the present embodiment, the operation interface 12a and the display 12b are provided as a touch screen.

The USB connector 13 (as one example of an interface) is a receptacle (female). The USB connector 13 is disposed such that its opening for receiving a plug (male) is exposed to the outside from the housing. The USB connector 13 includes a VBUS terminal, a D+ communication terminal, a D− communication terminal, a TX transmission terminal, a RX reception terminal, and a configuration channel (CC) terminal.

Figure 2:
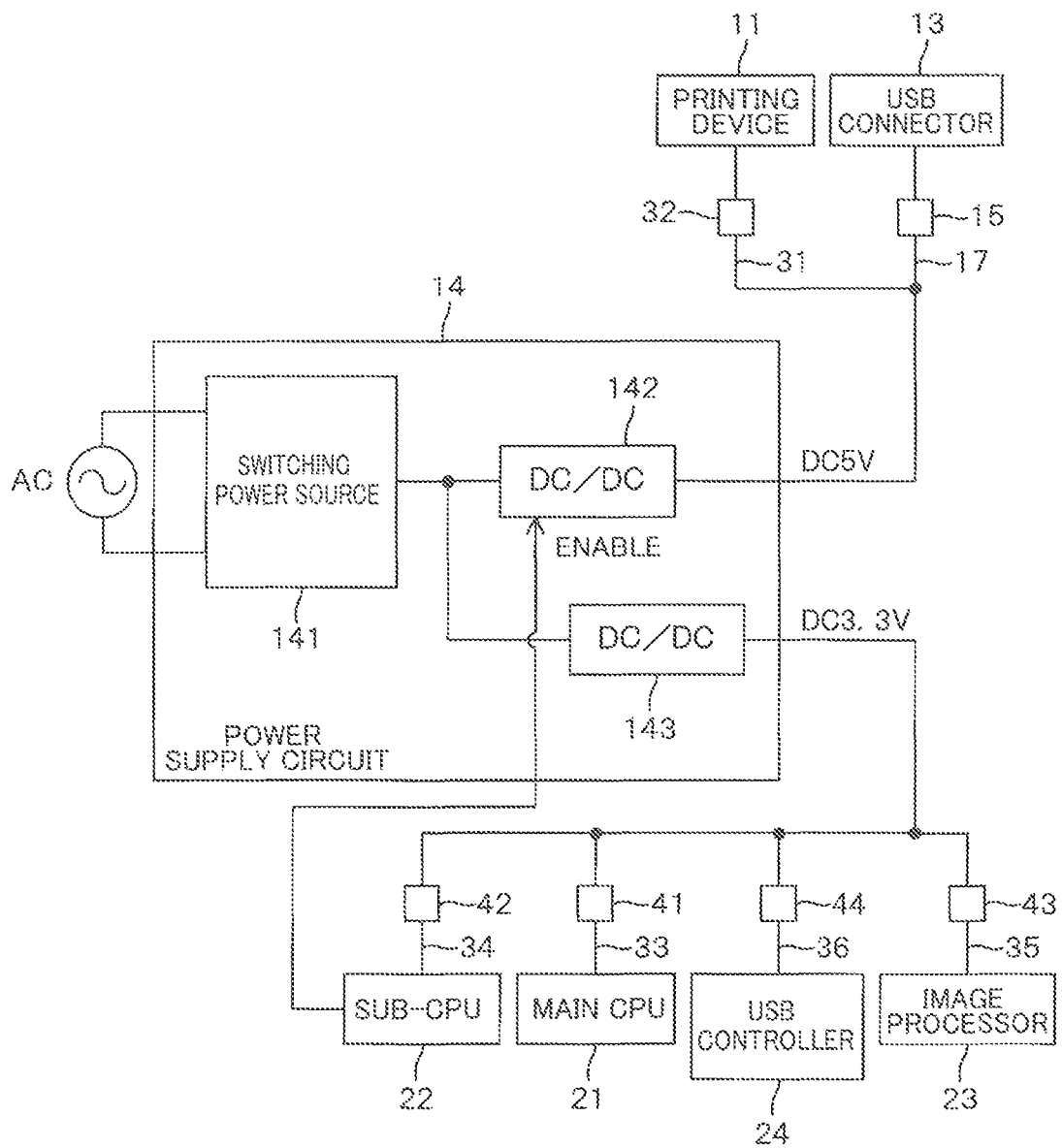
FIG. 2 is a block diagram illustrating a configuration of a power circuit.
Figure 3:
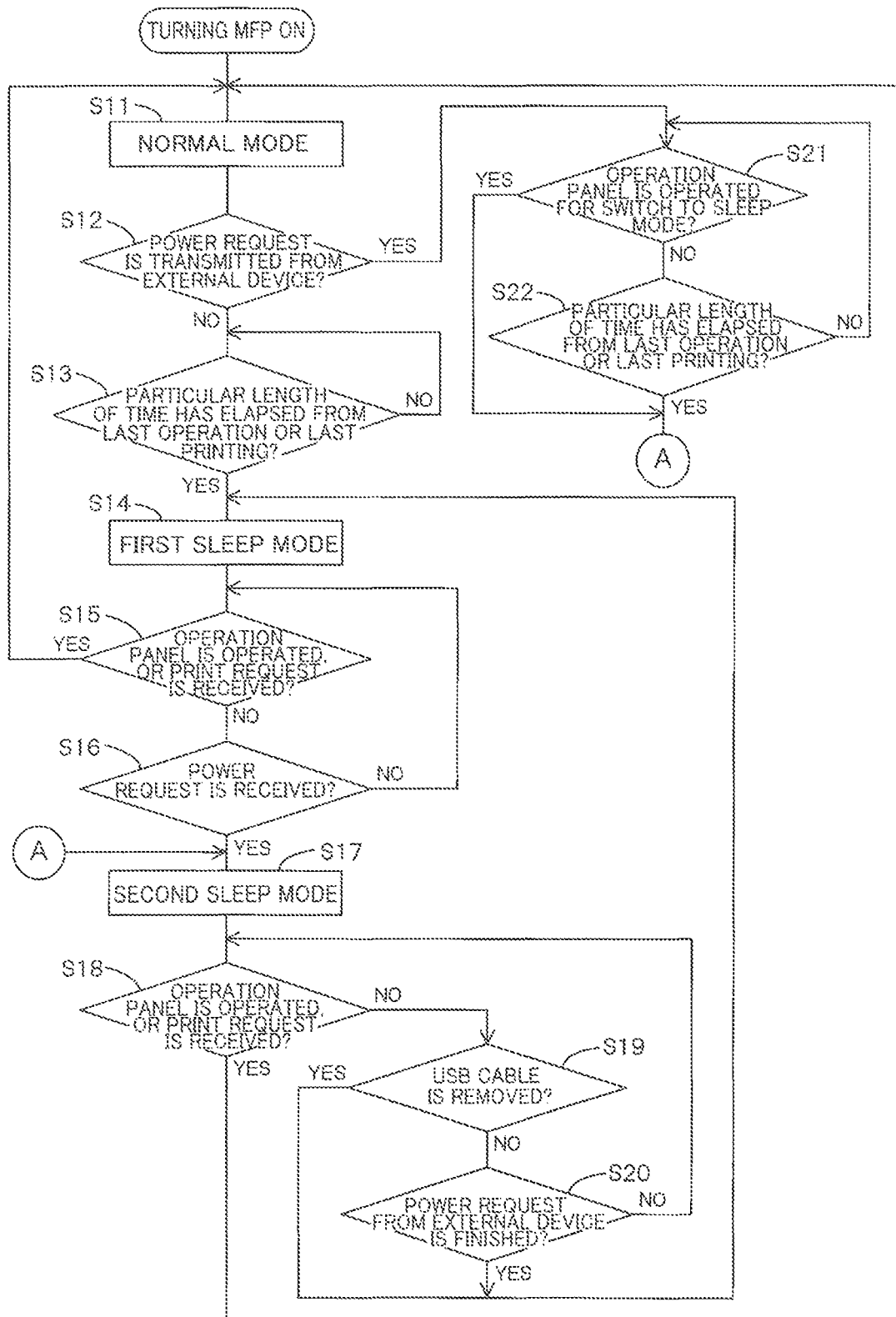
FIG. 3 is a flowchart representing a mode switching process.

As illustrated in FIG. 2, the power supply circuit 14 includes a switching power source 141 and DC/DC converters 142, 143. The switching power source 141 converts an alternating voltage supplied from a commercial alternating-current power supply AC via a pair of power supply lines, into a direct voltage. The switching power source 141 includes a diode bridge, a transformer, and a rectifying and smoothing circuit. The switching power source 141 outputs a direct voltage of 24 V, for example. Each of the DC/DC converters 142, 143 includes a linear regulator and lowers the direct voltage output from the switching power source 141. The DC/DC converter 142 lowers the voltage output from the switching power source 141, to a first predetermined voltage (e.g., DC 5 V). The DC/DC converter 143 lowers the voltage output from the switching power source 141, to a second predetermined voltage (e.g., DC 3.3 V). In the present embodiment, a combination of the power supply circuit 14, the switch 15, and switches 32, 41-44, which will be described later, is one example of a power source.

The power supply circuit 14 includes a plurality of output terminals. The power supply circuit 14 supplies operating electric power from the output terminals to devices including the print engine 11 and the operation panel 12. One of the output terminals which outputs the first predetermined voltage is connected to the VBUS terminal of the USB connector 13 via a power supply line 17. Though not illustrated, the power supply circuit 14 includes a power-source controller for controlling operations of the power supply circuit 14.

The switch 15 is an N-channel metal oxide semiconductor field-effect transistor (MOSFET), for example. A drain terminal of the switch 15 is connected to the power supply line 17, and a source terminal of the switch 15 is grounded via a resistance. The switch 15 performs switching (ON/OFF) by a voltage input to a gate terminal of the switch 15.

The ASIC 16 includes: a main central processing unit (CPU) 21, a sub-CPU 22, an image processor 23, a USB controller 24, and a LAN interface (I/F) 25. The main CPU 21, the sub-CPU 22, the image processor 23, the USB controller 24, and the LAN interface 25 are connected to each other by a bus 26 so as to perform data communication with each other. The USB controller 24 may include: a USB power controller configured to control the power source; and a USB communication controller, separately.

Each of the main CPU 21 (as one example of a first controller) and the sub-CPU 22 (as one example of a second controller) controls operations of the devices including the print engine 11 and the operation panel 12 by executing programs for various processings based on a signal or the like input to the ASIC 16. The sub-CPU 22 is lower than the main CPU 21 in quality and power consumption.

The image processor 23 is configured to process image data and control operations of the print engine 11.

The USB controller 24 controls its data communication with external devices connected to the USB connector 13. The USB controller 24 controls ON/OFF of the switch 15 to control supply of electric power to the external devices connected to the USB connector 13.

The LAN interface 25 is provided for connection to a Local Area Network (LAN).

As illustrated in FIG. 2, the print engine 11 is connected via a power supply line 31 to the one of the output terminals of the power supply circuit 14, which outputs the first predetermined voltage (e.g., DC 5 V). The switch 32 is connected to the power supply line 31. The switch 32 switches between a current conducting state and a current nonconducting state in the power supply line 31. To one of the output terminals of the power supply circuit 14 which outputs the second predetermined voltage (e.g., DC 3.3 V), the main CPU 21 is connected via a power supply line 33, the sub-CPU 22 via a power supply line 34, the image processor 23 via a power supply line 35, and the USB controller 24 via a power supply line 36. The switch 41 is connected to the power supply line 33. The switch 41 switches between a current conducting state and a current nonconducting state in the power supply line 33. The switch 42 is connected to the power supply line 34. The switch 42 switches between a current conducting state and a current nonconducting state in the power supply line 34. The switch 43 is connected to the power supply line 35. The switch 43 switches between a current conducting state and a current nonconducting state in the power supply line 35. The switch 44 is connected to the power supply line 36. The switch 44 switches between a current conducting state and a current nonconducting state in the power supply line 36. Each of the switches 32, 41-44 is a semiconductor switching element such as a MOSFET.

Mode Switching Process

A power consumption mode of the printer 1 includes a normal mode (as one example of a first mode), a first sleep mode (as one example of a second mode), and a second sleep mode (as one example of a third mode). The main CPU 21 controls ON/OFF of each of the switches 32, 41-44 in the normal mode. The sub-CPU 22 controls ON/OFF of the switch 41 in the first sleep mode and the second sleep mode.

When a power source of the printer 1 is switched from an OFF state to an ON state, in other words, when the printer 1 is turned on, alternating power is supplied from the commercial alternating-current power supply AC to the power supply circuit 14, so that the operating electric power is supplied from the power supply circuit 14 to devices including the ASIC 16. While receiving the supplied operating electric power, the main CPU 21 and the sub-CPU 22 of the ASIC 16 cooperate to execute a mode switching process illustrated in FIG. 4 to switch the power consumption mode of the printer 1.

The mode switching process begins with S11 at which the main CPU 21 sets the power consumption mode of the printer 1 to the normal mode.

The normal mode is a mode in which the switches 32, 41-44 are turned on by the main CPU 21, and the electric power is supplied to the print engine 11, the operation panel 12, the power-source controller of the power supply circuit 14, and the devices of the ASIC 16 to operate the devices of the printer 1 (ON state). In the normal mode, the USB controller 24 turns the switch 15 to ON (i.e., its ON position), making the electric power suppliable to the external devices connected to the USB connector 13. It is noted that the switches being in the OFF state in the first sleep mode and the second sleep mode among the switches 15, 32, 41-44 are turned to ON by the sub-CPU 22.

In the normal mode, the main CPU 21 determines whether supply of the electric power is requested from the external device connected to the USB connector 13. In a state in which a plug of a USB cable connected to and extending from the external device is inserted in the USB connector 13, the external device and the USB controller 24 are communicably connected to each other for a negotiation between the external device and the USB controller 24. In the case where the external device needs supply of the operating electric power and/or the electric power for electric charge of a battery provided in the external device, a request for supply of the electric power (hereinafter may be simply referred to as "power request") is transmitted from the external device to the USB controller 24. When the power request is received by the USB controller 24, the main CPU 21 determines that the supply of the electric power is requested from the external device.

When the power request is not transmitted from the external device (S12: NO), the main CPU 21 at S13 determines whether or not a particular length of time has elapsed from a later one of the time point of the end of the last operation of the operation panel 12 and the time point of the end of the last printing operation.

When the particular length of time has elapsed from a later one of the time point of the end of the last operation and the time point of the end of the last printing operation (S13: YES), that is, when a state in which neither the operation of the operation panel 12 nor the printing operation is being performed has continued for the particular length of time, the main CPU 21 at S14 switches the power consumption mode from the normal mode to the first sleep mode. When switching the power consumption mode from the normal mode to the first sleep mode, the main CPU 21 turns the switches 41, 43, 32 to OFF and transmits a disenable signal to the DC/DC converter 142 to change the DC/DC converter 142 to its stopped state.

Figure 4:
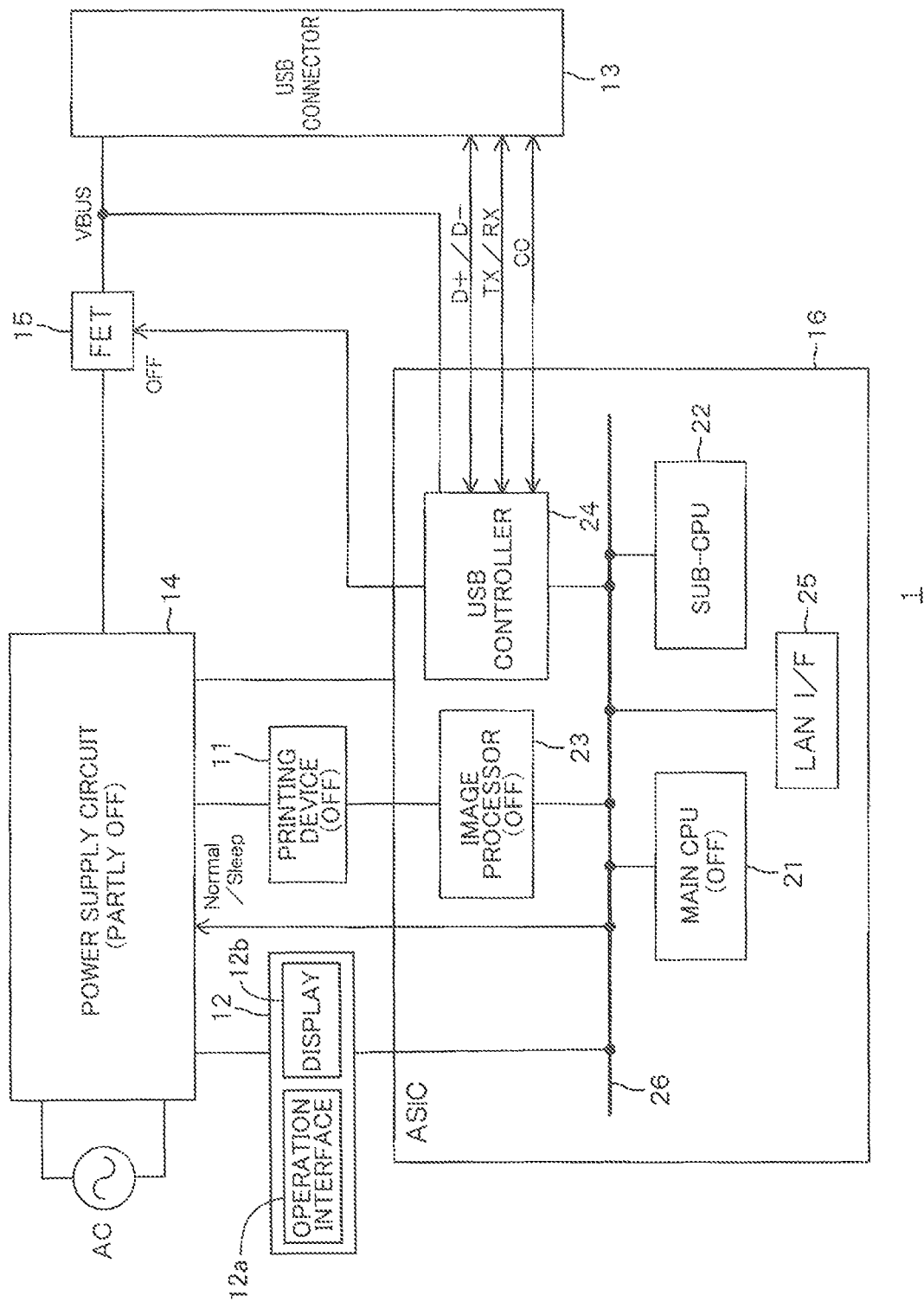
FIG. 4 is a block diagram illustrating the electric configuration of the printer and illustrating a state in a first sleep mode.

As illustrated in FIG. 4, the first sleep mode is a mode in which the electric power is supplied to the operation interface 12a of the operation panel 12, a portion of the power supply circuit 14, and the sub-CPU 22 and the USB controller 24 of the ASIC 16, and thereby these devices are operated. In the first sleep mode, no electric power is supplied to the print engine 11, the display 12b of the operation panel 12, and the main CPU 21 and the image processor 23 of the ASIC 16, in other words, supply of the electric power to these devices is in a stopped state. Thus, the first sleep mode is lower in power consumption than the normal mode. In the first sleep mode, since the supply of the electric power to the main CPU 21 is in a stopped state, and the main CPU 21 is not operated, the switch 42 is kept ON, and the sub-CPU 22 takes over execution of the mode switching process from the main CPU 21. A part of the other portion of the power supply circuit 14 is the DC/DC converter 142, specifically. When the disenable signal is input from the sub-CPU 22 to the DC/DC converter 142, operation of the DC/DC converter 142 is stopped. As a result, no electric power is supplied to the print engine 11 and the USB connector 13. Operation of the DC/DC converter 143 as a portion of the power supply circuit 14 is not stopped, but since the switches 41, 43 are turned to OFF, no electric power is supplied to the main CPU 21 and the image processor 23. It is noted that the switches 41, 43 are controlled by the sub-CPU 22.

When the power consumption mode is switched from the normal mode to the first sleep mode, the sub-CPU 22 at S15 determines whether or not the operation panel 12 is operated by the user (in other words, a user operation is performed), or a print request is received from an external terminal such as a personal computer (PC).

When the operation panel 12 is not operated, and no print request transmitted from the external terminal is received by the LAN interface 25, the sub-CPU 22 at S16 determines whether the power request transmitted from the external device is received.

When the external device is not connected to the USB connector 13, or no power request transmitted from the external device connected to the USB connector 13 is received (S16: NO), the sub-CPU 22 at S15 determines again whether or not the operation panel 12 is operated by the user, or the print request transmitted from the external terminal is received.

The power consumption mode is kept at the first sleep mode until the operation panel 12 is operated, the print request transmitted from the external terminal is received by the LAN interface 25, or the power request is received from the external device connected to the USB connector 13.

When the operation panel 12 is operated, or the print request transmitted from the external terminal is received by the LAN interface 25 in the first sleep mode (S15: YES), the sub-CPU 22 at S11 switches the power consumption mode from the first sleep mode back to the normal mode. That is, the sub-CPU 22 restarts supplying the electric power to the print engine 11, the display 12b of the operation panel 12, the part of the other portion of the power supply circuit 14, and the main CPU 21 and the image processor 23 of the ASIC 16. That is, the sub-CPU 22 outputs an enable signal to the DC/DC converter 142 to change the DC/DC converter 142 to its operating state, and turns the switches 41, 43 to ON.

It is noted that, when the power consumption mode is switched from the first sleep mode to the normal mode, after the sub-CPU 22 restarts supplying the electric power to the main CPU 21, the main CPU 21 may take over execution of the mode switching process from the sub-CPU 22 and restart supplying the electric power to the devices including the print engine 11.

When the power request is received from the external device connected to the USB connector 13 in the first sleep mode (S16: YES), the sub-CPU 22 at S17 switches the power consumption mode from the first sleep mode to the second sleep mode. When switching the power consumption mode from the first sleep mode to the second sleep mode, the sub-CPU 22 outputs the enable signal to the DC/DC converter 142 to change the DC/DC converter 142 to its operating state.

Figure 5:
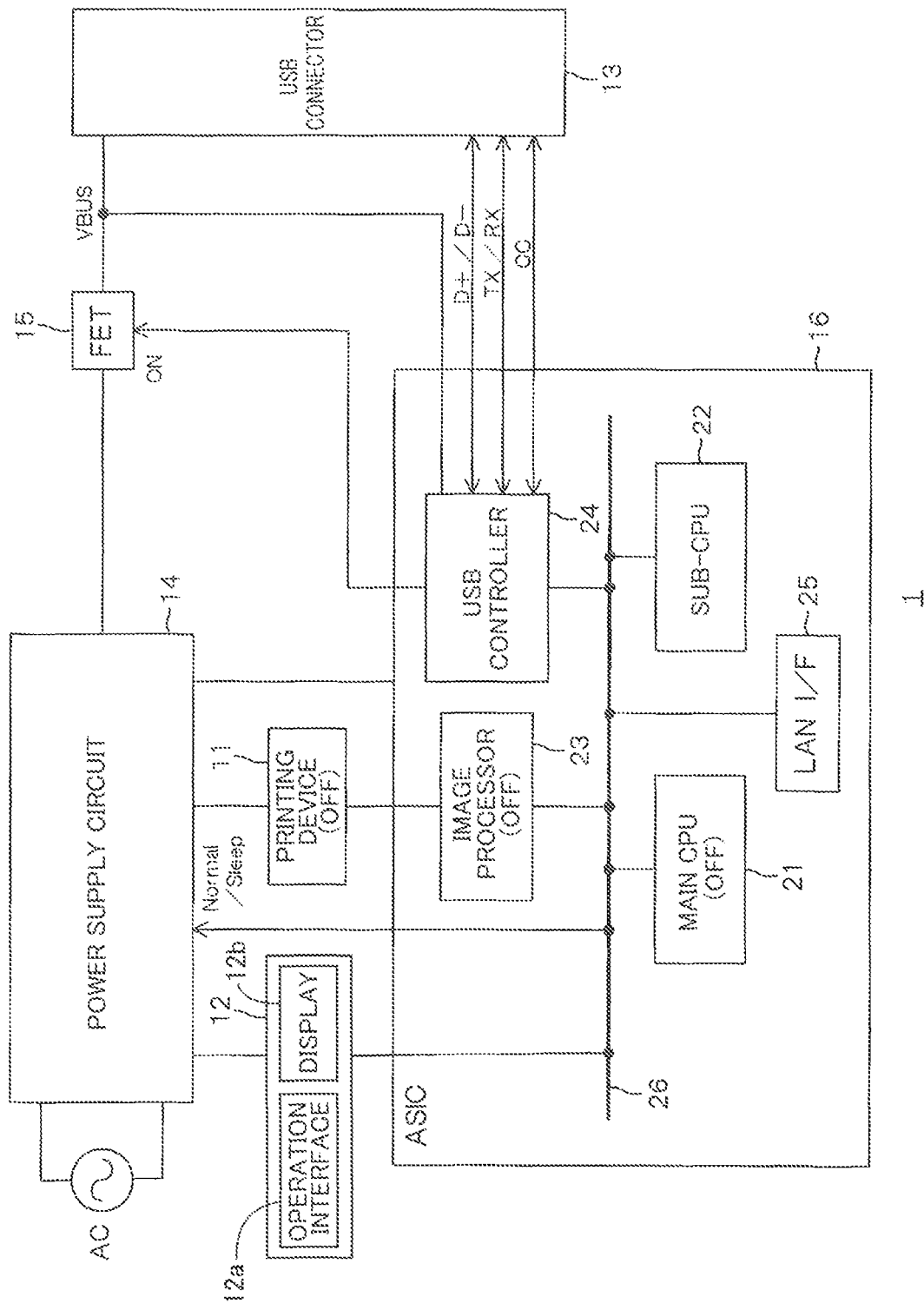
FIG. 5 is a block diagram illustrating the electric configuration of the printer and illustrating a state in a second sleep mode.

As illustrated in FIG. 5, the second sleep mode is a mode in which the electric power is supplied to the operation interface 12a of the operation panel 12 (as one example of the user interface), the entire power supply circuit 14, and the sub-CPU 22 and the USB controller 24 of the ASIC 16, and thereby these devices are operated. In the second sleep mode, supply of the electric power to the print engine 11, the display 12b of the operation panel 12, and the main CPU 21 and the image processor 23 of the ASIC 16 is stopped. Thus, the second sleep mode is lower in power consumption than the normal mode but higher in power consumption than the first sleep mode because the electric power is supplied to the entire power supply circuit 14. Also in the second sleep mode, the switch 41 is set to OFF by the sub-CPU 22, and the supply of the electric power to the main CPU 21 is stopped, so that the sub-CPU 22 executes the mode switching process. It is noted that the switch 41 is controlled by the sub-CPU 22.

When the power request is received from the external device in the second sleep mode, the USB controller 24 turns the switch 15 to ON. Since the power supply circuit 14 is in operation, when the switch 15 is turned to ON, the electric power is supplied from the power supply circuit 14 via the USB connector 13 to the external device connected to the USB connector 13.

In the second sleep mode, thereafter, the sub-CPU 22 at S18 determines whether or not the operation interface 12a of the operation panel 12 is operated by the user, or a print request is received from the external terminal.

When the operation interface 12a of the operation panel 12 is not operated, and no print request transmitted from the external terminal is received by the LAN interface 25 (S18: NO), the sub-CPU 22 at S19 determines whether a plug of a USB cable is removed from the USB connector 13.

When the plug of the USB cable is not removed from the USB connector 13 (S19: NO), the sub-CPU 22 at S20 determines whether the power request from the external device is finished.

When the plug of the USB cable is not removed from the USB connector 13, and the power request from the external device connected to the USB connector 13 via the USB cable is not finished (S20: NO), the sub-CPU 22 at S18 determines again whether or not the operation interface 12a of the operation panel 12 is operated by the user, or the print request transmitted from the external terminal is received.

When the plug of the USB cable is removed from the USB connector 13 (S19: YES), or the power request from the external device is finished (S20: YES), the USB controller 24 turns the switch 15 to OFF. The sub-CPU 22 outputs the disenable signal to switch a power supply state from a state in which the electric power is supplied to the entire power supply circuit 14, to a state in which the electric power is supplied to a portion of the power supply circuit 14. This operation switches the power consumption mode from the second sleep mode back to the first sleep mode (S14).

When the operation interface 12a of the operation panel 12 is operated, or the print request transmitted from the external terminal is received by the LAN interface 25 in the second sleep mode (S18: YES), the sub-CPU 22 at S11 switches the power consumption mode from the second sleep mode back to the normal mode. That is, the sub-CPU 22 restarts supplying the electric power to the print engine 11, the display 12b of the operation panel 12, the part of the other portion of the power supply circuit 14, and the main CPU 21 and the image processor 23 of the ASIC 16. When switching the power consumption mode from the first sleep mode back to the normal mode, the sub-CPU22 turns the switches 41, 43 to ON.

When the power request is received from the external device connected to the USB connector 13 in the normal mode (S12: YES), the USB controller 24 turns the switch 15 to ON in response to the power request. When the switch 15 is turned to ON, the electric power is supplied from the power supply circuit 14 via the USB connector 13 to the external device connected to the USB connector 13.

The main CPU 21 then at S21 determines whether the operation panel 12 is operated by the user to provide an instruction for switching the power consumption mode to a sleep mode.

When the operation panel 12 is not operated by the user to provide the instruction for switching the power consumption mode to the sleep mode (S21: NO), the main CPU 21 at S22 determines whether a particular length of time has elapsed from a later one of the time point of the end of the last operation of the operation panel 12 and the time point of the end of the last printing operation.

When the particular length of time has not elapsed from a later one of the time point of the end of the last operation and the time point of the end of the last printing operation, the main CPU 21 at S21 determines again whether the operation panel 12 is operated to provide an instruction for switching the power consumption mode to the sleep mode.

When the operation panel 12 is operated to provide an instruction for switching the power consumption mode to the sleep mode (S21: YES), or the particular length of time has elapsed from a later one of the time point of the end of the last operation and the time point of the end of the last printing operation without any operation for providing an instruction for switching the power consumption mode to the sleep mode (S22: YES), the main CPU 21 at S17 switches the power consumption mode from the normal mode to the second sleep mode. As a result, supply of the electric power to the external device connected to the USB connector 13 is continued.

Effects

As described above, the electric power is supplied from the power supply circuit 14 to the print engine 11 and the USB connector 13 in the normal mode. In the first sleep mode, the supply of the electric power from the power supply circuit 14 to the print engine 11 and the USB connector 13 is stopped. In the second sleep mode, the supply of the electric power from the power supply circuit 14 to the print engine 11 is stopped, and the electric power is supplied from the power supply circuit 14 to the USB connector 13.

When an external device is connected to the USB connector 13 in the first sleep mode, and the power request is received from the external device, the power consumption mode is switched from the first sleep mode to the second sleep mode, and the electric power is supplied from the power supply circuit 14 to the USB connector 13.

Accordingly, in the case where supply of the electric power is requested from the external device connected to the USB connector 13, the electric power is supplied from the power supply circuit 14 to the USB connector 13, making it possible to supply the electric power from the USB connector 13 to the external device.

In the normal mode, the electric power is supplied from the power supply circuit 14 to the main CPU 21. In the first sleep mode and the second sleep mode, the supply of the electric power from the power supply circuit 14 to the main CPU 21 is in the stopped state. In the first sleep mode and the second sleep mode, the mode switching process is executed by the sub-CPU 22 that is designed to be lower in power consumption than the main CPU 21. This configuration reduces power consumption in the first sleep mode and the second sleep mode.

The sub-CPU 22 switches the power consumption mode from the second sleep mode to the first sleep mode when a request for supply of the electric power from the external device connected to the USB connector 13 is finished in the second sleep mode, or the external device is disconnected from the USB connector 13 in the second sleep mode. Since the first sleep mode is lower in power consumption than the second sleep mode, power consumption of the printer 1 is reduced by switching the power consumption mode from the second sleep mode to the first sleep mode.

When a job is received by the job receiver in the second sleep mode, the sub-CPU 22 switches the power consumption mode from the second sleep mode to the normal mode. This operation restarts the supply of the electric power to the print engine 11, making it possible for the print engine 11 to perform printing.

The sub-CPU 22 switches the power consumption mode from the normal mode to the second sleep mode when the operation panel 12 is operated in the normal mode to provide an instruction for switching the power consumption mode to the sleep mode in the state in which the request for supply of the electric power is being received from the external device connected to the USB connector 13. This operation reduces power consumption of the printer 1 while continuing the supply of the electric power to the external device.

The sub-CPU 22 also switches the power consumption mode from the normal mode to the second sleep mode when the particular length of time has elapsed from a later one of the time point of the end of the last operation and the time point of the end of the last printing operation in the normal mode in the state in which the request for supply of the electric power is being received from the external device connected to the USB connector 13. This operation reduces power consumption of the printer 1 while continuing the supply of the electric power to the external device.

Modifications

While the embodiment has been described above, it is to be understood that the disclosure is not limited to the details of the illustrated embodiment, but may be embodied with various changes and modifications, which may occur to those skilled in the art, without departing from the spirit and scope of the disclosure.

For example, operations of the main CPU 21 and the image processor 23 are stopped by turning the switches to OFF in the above-described embodiment but may be stopped by stopping transmission of a clock signal from a clock circuit, not illustrated, to the main CPU 21 and the image processor 23.

Application of the present disclosure is not limited to the printer 1 including the print engine 11. For example, the present disclosure may be applied to scanners including a reader for reading an image formed on a document and to multi-function peripherals including both of the print engine 11 and a scanner engine. In the above-described embodiment, the sub-CPU 22 outputs the enable signal to the DC/DC converter 142 to change the DC/DC converter 142 to the operating state and outputs the disenable signal to the DC/DC converter 142 to change the DC/DC converter 142 to the stopped state. However, the sub-CPU 22 may continue outputting the enable signal to the DC/DC converter 142 to keep the DC/DC converter 142 in the operating state, and stop outputting the enable signal to the DC/DC converter 142 to change the DC/DC converter 142 to the stopped state.

What is claimed is:

1. An image processing apparatus, comprising:
    an image-data processor;
    an interface;
    a power source; and
    a controller configured to:
        select one of a plurality of power supply modes of the image processing apparatus, the plurality of power supply modes including: (i) a first mode, when the image processing apparatus is in the first mode, electric power being supplied from the power source to the image-data processor and the interface; (ii) a second mode, when the image processing apparatus is in the second mode, supply of the electric power from the power source to the image-data processor and the interface being in a stopped state; and (iii) a third mode, when the image processing apparatus is in the third mode, the supply of the electric power from the power source to the image-data processor being in a stopped state, and the electric power being supplied from the power source to the interface; and
        switch the power supply mode from the second mode to the third mode in response to receiving a power supply request from an external device via the interface when the image processing apparatus is in the second mode in a state in which the external device is connected to the interface
    wherein the controller comprises:
        a first controller configured to control the image-data processor; and
        a second controller,
    wherein, when the image processing apparatus is in the second mode, the electric power is supplied from the power source to the second controller,
    wherein, when the image processing apparatus is in the second mode, the second controller is configured to switch the power supply mode from the second mode to the third mode in response to receiving the power supply request from the external device via the interface, and
    wherein, when the image processing apparatus is in the second mode, the supply of the electric power from the power source to the first controller is in a stopped state.

2. The image processing apparatus according to claim 1, wherein, when the image processing apparatus is in the third mode, the supply of the electric power from the power source to the first controller is in the stopped state.

3. The image processing apparatus according to claim 2, wherein, when the image processing apparatus is in the third mode, the electric power is supplied from the power source to the second controller.

4. The image processing apparatus according to claim 1, wherein the second controller is configured to switch the power supply mode from the third mode to the second mode in response to determining that the power supply request from the external device via the interface is finished.

5. The image processing apparatus according to claim 1, wherein the second controller is configured to switch the power supply mode from the third mode to the second mode in response to determining that the external device is disconnected from the interface in the third mode.

6. The image processing apparatus according to claim 1, wherein the second controller is configured to switch the power supply mode from the third mode to the first mode in response to receiving a job which is to be processed by the image-data processor.

7. The image processing apparatus according to claim 1, further comprising a user interface,
    wherein the second controller is configured to switch the power supply mode from the first mode to the third mode in response to determining that the user interface is operated.

8. The image processing apparatus according to claim 1, further comprising a user interface,
    wherein, when the second mode is selected, the second controller is configured to control the power source to supply the electric power from the power source to the user interface.

9. The image processing apparatus according to claim 1, wherein the interface is a USB (Universal Serial Bus) interface.

10. An image processing apparatus, comprising:
    an engine including at least one of a print engine and a scanner engine, the print engine being configured to print an image on sheet, the scanner engine being configured to scan an image from a document;
    an interface;
    a power source; and
    a controller configured to:
        select one of a plurality of power supply modes of the image processing apparatus, the plurality of power supply modes including: (i) a first mode, when the image processing apparatus is in the first mode, electric power being supplied from the power source to the engine and the interface; (ii) a second mode, when the image processing apparatus is in the second mode, supply of the electric power from the power source to the engine and the interface being in a stopped state; and (iii) a third mode, when the image processing apparatus is in the third mode, the supply of the electric power from the power source to the engine being in a stopped state, and the electric power being supplied from the power source to the interface; and switch the power supply mode from the second mode to the third mode in response to receiving a power supply request from an external device via the interface when the image processing apparatus is in the second mode in a state in which the external device is connected to the interface
    wherein the controller comprises:
        a first controller configured to control the engine; and
        a second controller,
    wherein, when the image processing apparatus is in the second mode, the electric power is supplied from the power source to the second controller,
    wherein, when the image processing apparatus is in the second mode, the second controller is configured to switch the power supply mode from the second mode to the third mode in response to receiving the power supply request from the external device via the interface, and wherein, when the image processing apparatus is in the second mode, the supply of the electric power from the power source to the first controller is in a stopped state.

11. The image processing apparatus according to claim 10, wherein, when the image processing apparatus is in the third mode, the supply of the electric power from the power source to the first controller is in the stopped state.

12. The image processing apparatus according to claim 11, wherein, when the image processing apparatus is in the third mode, the electric power is supplied from the power source to the second controller.

13. The image processing apparatus according to claim 10, wherein the second controller is configured to switch the power supply mode from the third mode to the second mode in response to determining that the power supply request from the external device via the interface is finished.

14. The image processing apparatus according to claim 10, wherein the second controller is configured to switch the power supply mode from the third mode to the second mode in response to determining that the external device is disconnected from the interface in the third mode.

15. The image processing apparatus according to claim 10, wherein the second controller is configured to switch the power supply mode from the third mode to the first mode in response to receiving a job which is to be processed by the engine.

16. The image processing apparatus according to claim 10, wherein the interface is a USB (Universal Serial Bus) interface.

17. A method of switching a mode of an image processing apparatus, the image processing apparatus comprising (i) an image-data processor configured to process image data, (ii) an interface configured to communicate with an external device, (iii) a power source, and (iv) a controller, the controller comprising a first controller configured to control the engine and a second controller, wherein the method comprises:
causing the controller to select one of a plurality of power supply modes of the image processing apparatus, the plurality of power supply modes including: (i) a first mode, when the image processing apparatus is in the first mode, electric power being supplied from the power source to the image-data processor and the interface; (ii) a second mode, when the image processing apparatus is in the second mode, supply of the electric power from the power source to the image-data processor and the interface being in a stopped state; and (iii) a third mode, when the image processing apparatus is in the third mode, the supply of the electric power from the power source to the image-data processor being in a stopped state, and the electric power being supplied from the power source to the interface;
causing the controller to switch the power supply mode from the second mode to the third mode in response to receiving a power supply request from an external device via the interface when the image processing apparatus is in the second mode in a state in which the external device is connected to the interface;
supplying the electric power from the power source to the second controller when the image processing apparatus is in the second mode;
causing the second controller to switch the power supply mode from the second mode to the third mode in response to receiving the power supply request from the external device via the interface when the image processing apparatus is in the second mode; and
causing the supply of the electric power from the power source to the first controller to be in a stopped state when the image processing apparatus is in the second mode.

18. A non-transitory storage medium storing a program executable by a computer of an image processing apparatus, the image processing apparatus comprising (i) an image-data processor configured to process image data, (ii) an interface configured to communicate with an external device, and (iii) a power source, the computer comprising a first controller configured to control the image-data processor and a second controller wherein when executed by the computer, the program causes the image processing apparatus to select one of a plurality of power supply modes of the image processing apparatus, the plurality of power supply modes including: (i) a first mode, when the image processing apparatus is in the first mode, electric power being supplied from the power source to the image-data processor and the interface; (ii) a second mode, when the image processing apparatus is in the second mode, supply of the electric power from the power source to the image-data processor and the interface being in a stopped state; and (iii) a third mode, when the image processing apparatus is in the third mode, the supply of the electric power from the power source to the image-data processor being in a stopped state, and the electric power being supplied from the power source to the interface, wherein when executed by the computer, the program causes the image processing apparatus to switch the power supply mode from the second mode to the third mode in response to receiving a power supply request from an external device via the interface when the image processing apparatus is in the second mode in a state in which the external device is connected to the interface, wherein when executed by the computer, the program causes the image processing apparatus to:
supply the electric power from the power source to the second controller when the image processing apparatus is in the second mode;
cause the second controller to switch the power supply mode from the second mode to the third mode in response to receiving the power supply request from the external device via the interface when the image processing apparatus is in the second mode; and
cause the supply of the electric power from the power source to the first controller to be in a stopped state when the image processing apparatus is in the second mode.

* * * * *